Figure 1:
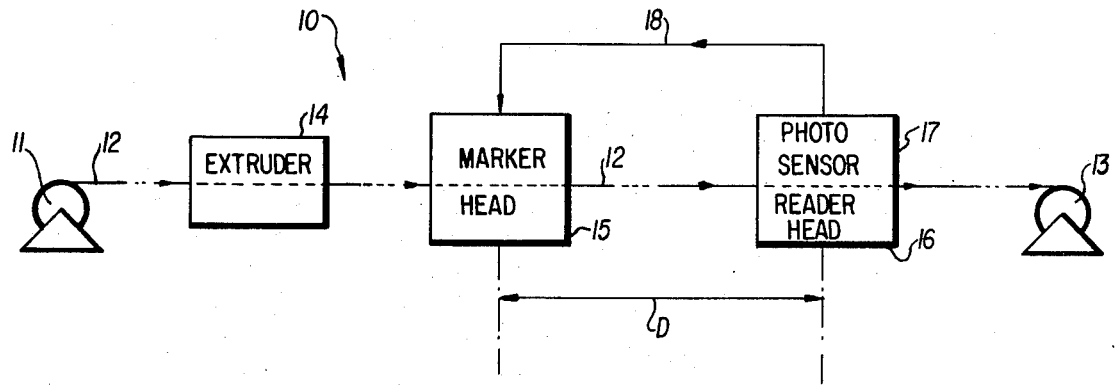

United States Patent

McDermitt

[15] 3,702,404
[45] Nov. 7, 1972

[54] WIRE LENGTH COUNTER

[72] Inventor: Floyd P. McDermitt, Carrollton, Ga.

[73] Assignee: Southwire Company, Carrollton, Ga.

[22] Filed: June 29, 1971

[21] Appl. No.: 157,948

[52] U.S. Cl. ............. 250/219 LG, 356/167, 33/127
[51] Int. Cl. ................................................ G01b 7/04
[58] Field of Search ...... 250/219 DF, 219 S, 219 LG, 250/222; 356/159, 160, 167, 199, 200, 237–239; 33/127

[56] References Cited

UNITED STATES PATENTS

| | | | |
|---|---|---|---|
| 2,989,690 | 6/1961 | Cook | 250/219 LG X |
| 3,143,017 | 8/1964 | Donnell | 250/219 LG X |
| 3,226,555 | 12/1965 | Miller | 250/219 LG X |
| 3,396,278 | 8/1968 | Hjorth | 250/219 LG |

*Primary Examiner*—Walter Stolwein
*Attorney*—Van C. Wilks et al.

[57] ABSTRACT

This disclosure relates to a system for marking a continuously moving filament at predetermined intervals along its length comprising a marker head for applying retro-reflective indicia to the filament, and a photosensor disposed a predetermined distance from the marker head for sensing the indicia and actuating the marker head to apply subsequent indicia to the filament. In a modification of the system, a second photosensor and a counter permit the velocity of the filament to be monitored, and a comparator then compares successive velocity readings and computes the time interval required between successive applications of indicia, whereby the indicia are applied to the filament at substantially equal intervals of length irrespective of variations in the velocity of the filament.

10 Claims, 2 Drawing Figures

INVENTOR
FLOYD P. McDERMITT
Van C. Wilks &
BY H. M. Honegan
ATTORNEYS

WIRE LENGTH COUNTER

This invention relates to the art of wire and cable manufacturing, and more particularly to a system which facilitates an accurate determination of the length of a filamentary product, such as wire, cable or tubing. Specifically, the system pertains to apparatus for making a continuously moving filament at predetermined intervals along its length, whereby the markings may be counted and the length of the filament thereby calculated.

In the past, mechanical counters were generally used to determine the total length of a product being manufactured. In the case of wire, for example, a fixed wheel was positioned in rolling contact with the moving wire and was adapted to advance a mechanical counter for each revolution thereof in response to a predetermined length of wire passing the counter. The diameter of the wheel, the circumference of which was adapted to roll in contact with the surface of the wire, was selected, of course, to be proportional to the unit of length being measured. The main disadvantage with such mechanical counters was that slippage occurring between the rapidly moving wire and the circumference of the wheel led to significant errors in the total length of the material being measured. The longer the length of the material, of course, and generally the greater the velocity of the moving material, the greater was the total error.

In an attempt to overcome the shortcomings of mechanical counters, the prior art developed electrical systems such as that disclosed in U.S. Pat. No. 2,603,688 to R. J. Cole et al. In this system, an electromagnetic marker or recorder head is utilized to magnetize portions of the moving ferromagnetic wire. A pick-up head disposed a predetermined distance from the recorder head senses the magnetized portions of the wire and generates pulses in response thereto which are transmitted back to the recorder head for marking another spot on the wire, while simultaneously actuating a counter for indicating the length of wire passing the device.

Although such electrical systems are generally satisfactory for relatively slow moving material that advances at a constant velocity, significant problems arise for rapidly moving material, which for wire, for example, may be reeled at 1,000 feet per minute or more, as well as for material that may advance at a variable velocity. Essentially, errors arise because of the mechanical delay in such a system. If the marks on the wire could be made at the speed of electricity, in most cases the system would be fairly accurate. However, because of the mechanical delay associated with the marking process itself, be it magnetizing the wire, or simply notching or otherwise physically marking the wire, significant errors will arise. In an attempt to compensate for this delay, the distance between the marker heads and the pick-up or sensing heads, which actuate the marker heads, had to be slightly less than the intended distance between successive marks on the wire. In this manner, the mechanical delay inherent in the marking process resulted in each mark being applied at approximately the intended distance from the preceding mark. Although such an arrangement could fairly effectively compensate for errors resulting from the mechanical delay in marking high speed wire, it could not correct for errors resulting from the marking of wire or other filamentary material advancing at a variable velocity. Because of the speed of the wire varies from time to time as a result of manufacturing operations being applied to it, normal slack and tension variations during reeling, and variable power inputs to the reeling apparatus, the distances between the marks will also tend to vary from the specified length, thus introducing another error into the final count.

It is, therefore, a primary object of this invention to provide a system for accurately marking a continuously moving filament at predetermined intervals along its length irrespective of the velocity of the filament or variations therein.

Another object of this invention is to provide an improved system for marking a continuously moving filament at predetermined intervals along its length comprising means for applying retro-reflective indicia to the filament, means for sensing the indicia, and means responsive to the sensing means for actuating the indicia applying means.

Still another object of this invention is to provide a system for marking a continuously moving filament at predetermined intervals along its length, including means for monitoring the velocity of the filament and for computing the elapsed time required between successive commands to mark the filament, wherein the elapsed time is a function of variations in the velocity of the filament.

Briefly, these objects are accomplished by first providing a marker head for applying indicia to the moving filament. First and second scanners, disposed a predetermined distance from each other, are adapted to sense the indicia. The second scanner is disposed a specific distance from the marker head corresponding to the intended distance between successive indicia to be marked on the filament. This distance may be one foot, ten feet, or any other basic unit of measurement by which the total length of the filament, or any portion thereof, may be determined. A first counter is provided which is responsive to the sensing of an indicia to move from the first scanner to the second scanner. Successive ones of such intervals, which are proportional to the velocity of the filament, are fed to a computer where they are compared to determine whether there is any change in the velocity of the filament. A second counter is also provided which begins counting upon sensing of the indicia by the second scanner. This count is monitored by the computer which computes the elapsed time required thereon, as a function of variations in the velocity of the filament as determined from the compared intervals or counts from the first counter, prior to issuing a command signal to actuate the marker head, whereby the distance between successive indicia will be constant irrespective of variations in the velocity of the filament.

With the above and other objects in view that may hereinafter appear, the invention will be more clearly understood by reference to the several views illustrated in the accompanying drawings, the detailed description thereof, and the appended claimed subject matter.

Figure 2:
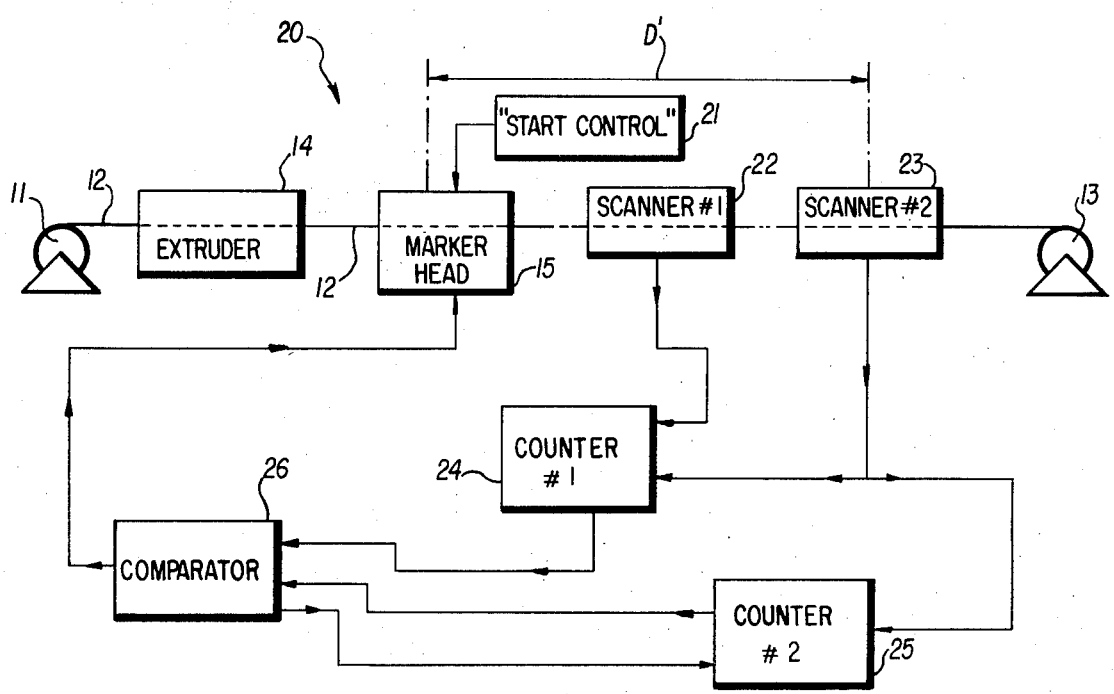

IN THE DRAWINGS:

FIG. 1 is a schematic view of a retro-reflective system for marking a continuously moving filament at predetermined intervals along its length; and FIG. 2 is a schematic view of a modified system for accurately marking a continuously moving filament at predetermined and constant intervals along its length, and depicts scanners, counters, and a comparator which facilitate accurate marking irrespective of variations in the velocity of the filament.

Referring now to the drawings in detail, there is illustrated in FIG. 1 a retro-reflective system, generally designated by the numeral 10 for marking a moving filament at predetermined intervals along its length.

The system 10 includes a supply spool 11 upon which is wound a length of filament 12 such as wire, cable, tubing, or any other material that is intended to be marked by the system 10 at specified intervals to facilitate a determination of the length thereof. The filament 12 is drawn through the system 10 by a powered take-up spool 13. Various operations, of course, may be performed on the filament 12 as it is drawn from the supply spool 11 to the take-up spool 13. In the case of wire, for example, an extruder 14 may be provided for continuously applying an insulation covering thereto.

The system 10 also includes a marker head 15 and a reader head 16 disposed a specified distance D therefrom corresponding to the intended distance between marks or indicia as applied to the filament 12. In practice, the distance D is actually set somewhat less than the intended distance between marks on the filament in order to compensate for the reaction time of the system 10 resulting from the mechanical delay associated with the marking process. In fact, therefore, the distance D does not correspond exactly to the distance between marks on the filament, but rather is that distance minus a factor corresponding to the reaction time computed as a function of the particular intended velocity of the filament 12.

As the filament 12 is drawn past the marker head 15, a signal periodically commands the marker head 15 to apply a retro-reflective material, such as paint with glass beads or a small piece of reflective tape, to a spot on the filament 12. The marked point on the filament 12 then proceeds to the reader head 16 which emits a light on the retro-reflective mark. A photosensor 17 associated with the reader head 16 picks up the light reflected from the retro-reflective mark and in response thereto transmits a signal, as indicated by the line 18, back to the marker head 15 thereby actuating the marker head 15 to apply another mark to the filament 12. It should be apparent, therefore, that the process will continue and that successive marks will be applied to the filament 12 along the length thereof spaced apart by a distance corresponding to the distance D. Inasmuch as the distance D is a predetermined and specified unit of length, it is a simple matter to run the marked filament 12 past any type of suitable sensor to count the marks and thereby determine the length of the filament 12 or any portion thereof.

As explained above, however, the system 10 will provide an accurate spacing between marks, and thus an accurate determination of length, only when the filament 12 is moving relatively slowly and at a constant velocity. When the filament 12 is moving rapidly, and especially when its velocity is variable, the distance between the marks will vary from the distance D and thus an accurate determination of the length of the filament 12 is impossible.

A modified form of the system 10 is illustrated in FIG. 2 and is designated by the numeral 20. In addition to the elements used in system 10, the system 20 includes a start control 21, a first scanner 22, a second scanner 23, a first counter 24, a second counter 25, and a comparator 26 which is a special purpose digital computer. where As the filament 12 is being drawn from the supply spool 11 to the take-up spool 13, the system 20 is put into operation by actuating the start control 21 which causes the marker head 15 to place a first mark or indicia $m_1$ on the moving filament 12. The mark $m_1$ is then advanced and sensed by the first scanner 22 which transmits a signal in response thereto to the first counter 24 starting the count thereon. The mark $m_1$ then continuous to advance to the second scanner 23, which is disposed a relatively short and specified distance from the scanner 22, where it is sensed and a signal transmitted in response thereto that has two functions. The first function is to stop the count on the counter 24 and reset the counter 24 to zero. The elapsed time or count is stored in the counter 24 and represents the velocity $v_1$ of the mark $m_1$ between the scanner 22 and the scanner 23. Because the distance between scanners 22, 23 is relatively short, any acceleration of the filament 12 during traversal of the mark $m_1$ therebetween is negligible. The second function of the signal transmitted in response to the mark $m_1$ being sensed by the scanner 23 is to start the count on the second counter 25.

The stored count or velocity representation $v_1$ from the counter 24 is fed to the comparator 26, as is the elapsing time on the counter 25. After a specified reference time $T_r$, the comparator 26 simultaneously stops the counter 25 and resets it to zero, and transmits a command signal to the marker head 15 thereby actuating the marker head 15 to apply a second mark or indicia $m_2$ to the filament 12.

When the mark $m_2$ passes the scanners 22, 23, the same process is repeated. The time interval, and thus the velocity $v_2$, for the mark $m_2$ to move from the first scanner 22 to the second scanner 23 is measured by the counter 24 and the count again fed to the comparator 26. The sensing of the mark $m_2$ by the scanner 23 again starts the count on the counter 25 which is monitored by the comparator 26. The comparator 26 then compares $v_2$ to $v_1$ and computes the time differential from $T_r$ required to elapse on counter 25, prior to issuing a command signal to the marker head 15, thereby compensating for any variation in the velocity of the filament 12 and thus permitting the marks to be accurately spaced apart by the specified distance $D'$. Thereafter, as each mark $m_n$ passes the second scanner 23, if the velocity readings $v_n$ vary from each preceding reading $v_{n-1}$, the permitted elapsed time on counter 25 prior to issuance of a mark command signal will be $T_r \pm t_n$, wherein $t_n$ represents the time required to compensate for the velocity change from $v_{n-1}$ to $v_n$.

It should be noted that just as in system 10 where the distance D is reduced by the reaction time of the system for the particular intended fixed velocity of the filament 12, the distance $D'$ is similarly reduced by a factor corresponding to the reaction time of the system 20 for the maximum expected velocity of the filament 12.

The particular counters 24 and 25 employed may be any one of a number of types which are available commercially such as Counter Model Number 059230-430 available from the Durant Manufacturing Company, Milwaukee, Wisconsin 53201. The comparator 26 is similarly available commercially such as Comparator Model Number 5-6-N-76, QL-CL available from Davis Electric Company, Wallingford, Connecticut.

In view of the foregoing, it should be readily apparent that there is provided in accordance with this invention a new and improved system for marking a moving filament at predetermined intervals along the length thereof in facilitation of an accurate method of calculating its length. The system is vastly superior to prior art mechanical systems as well as other electrical systems which are subject to errors caused by the marking of rapidly moving filaments of variable velocity.

Although only preferred embodiments of the invention have been specifically disclosed and described herein, it is to be understood that minor variations may be made without departing from the spirit of the invention.

I claim:

1. In apparatus for marking a continuously moving filament at predetermined intervals along its length comprising means for applying indicia to said filament, means for sensing said indicia, and means responsive to said indicia sensing means for actuating said indicia applying means; the improvement therein comprising means for determining the velocity of said filament at selected time intervals, means for comparing said velocities, and means responsive to said means for comparing for applying said indicia, so as to apply said indicia to said filament at substantially equal intervals of length irrespective of variations in the velocity of said filament and irrespective of any mechanical delay in said indicia applying means.

2. Apparatus as defined in claim 1 wherein said means for determining velocity includes first and second scanners for sensing said indicia.

3. Apparatus as defined in claim 2 wherein said first and second scanners are disposed a predetermined distance from each other and means responsive to the sensing of said indicia respectively by said scanners for measuring the time interval for said indicia to move from one scanner to the other.

4. Apparatus as defined in claim 3 including means for comparing successive intervals of time for successive indicia to move from one scanner to the other and for computing the elapsed time required between successive markings of said filament.

5. Apparatus as defined in claim 4 wherein said means for comparing and for computing is a special purpose digital computer.

6. Apparatus as defined in claim 1 including retro-reflective means for marking said filament, and photoelectric means for sensing said indicia.

7. Apparatus for marking a continuously moving filament at predetermined intervals along its length, comprising means for applying indicia to said filament, first means for sensing said indicia, second means disposed a predetermined distance from said first means for sensing said indicia, means responsive to the sensing of said indicia by said first means for measuring the time interval for said indicia to move from said first means to said second means, and means responsive to the sensing of said indicia by said second means for comparing the time intervals for successive indicia to move from said first means to said second means and for actuating said indicia applying means after a computed interval of time, so as to apply said indicia to said filament at substantially equal intervals of length irrespective of variation in the velocity of said filament and irrespective of any mechanical delay in said indicia applying means.

8. Apparatus as defined in claim 7 wherein said means responsive to the sensing of said indicia by said first means is a counter adapted to begin counting when said indicia is sensed by said first means and to stop counting when said indicia is sensed by said second means, and wherein said counter is adapted to store the count.

9. Apparatus as defined in claim 7 wherein said means responsive to the sensing of said indicia by said second means includes a counter adapted to begin counting when said indicia is sensed by said second means and to stop counting when said indicia applying means is actuated.

10. Apparatus as defined in claim 9 wherein the time permitted to elapse on said counter prior to actuation of said indicia marking means is computed as a function of variations in the time intervals for successive indicia to move from said first means to said second means.

* * * * *